U. S. PATENT OFFICE.

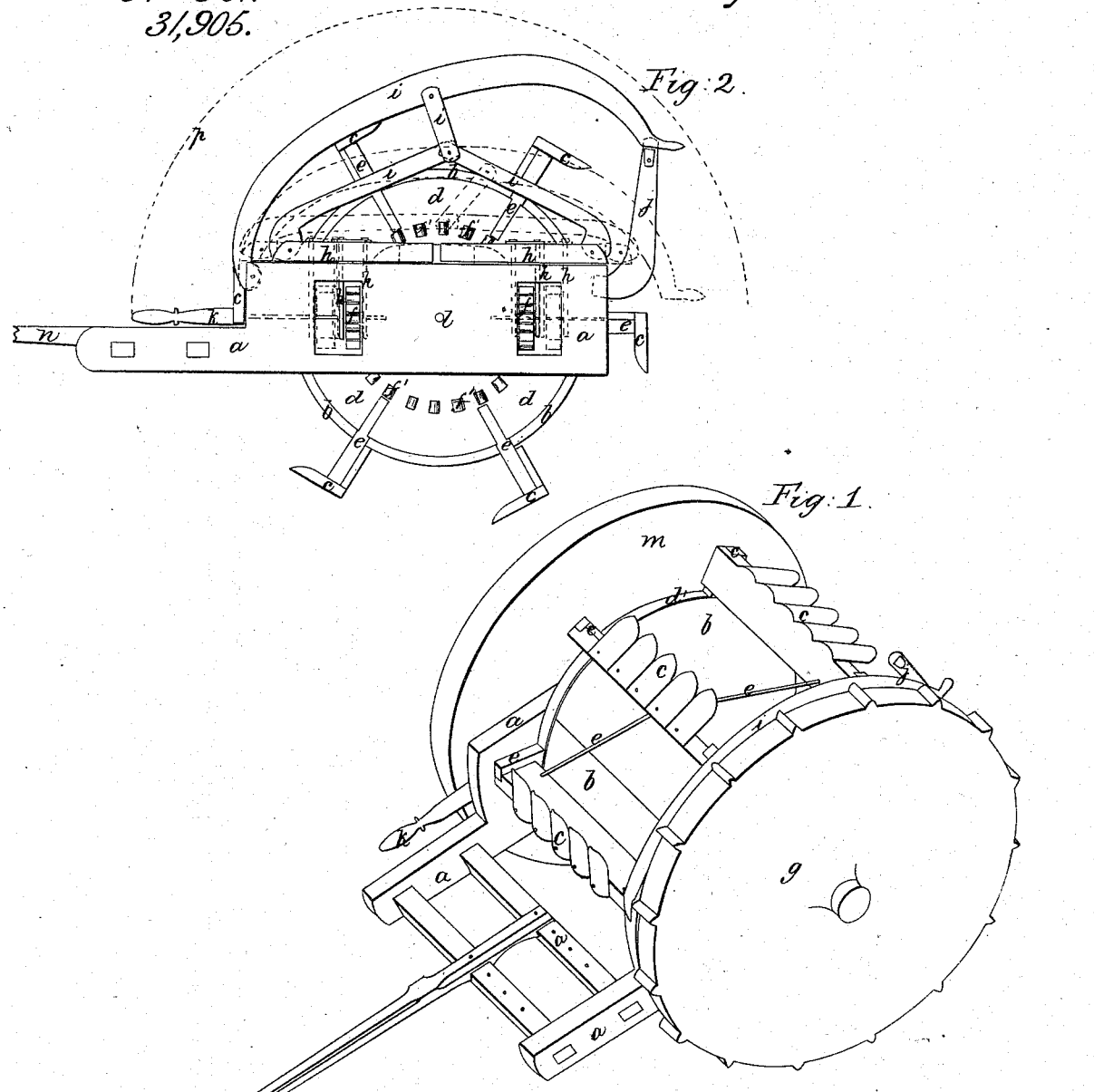

No. 901.        1861.        Whole No. 31,905.

Excavators.

WILLIAM RANDALL, OF UXBRIDGE, CANADA.

Letters Patent No. 901, dated April 2, 1861.

SPECIFICATION.

TO ALL WHOM IT MAY CONCERN:

Be it known, that I, WILLIAM RANDALL, a citizen of the United States, residing at Uxbridge, Ontario County, in the Province of Canada, have invented a new and useful machine for Excavating Earth; and I do hereby declare that the following is a full, clear, and exact description of the construction and operation of the same, reference being had to the annexed drawings making a part of this specification, in which—

Figure 1 is a perspective view.

Figure 2 is a view of the working parts after removing the wheels $g$ & $m$.

$a\ a$ is the frame; $b$ is the cylinder-formed box for carrying the earth; $c\ c$ are sets of shovels for taking up the earth and depositing it in the box $b$. $d\ d'$ are disks for carrying the shovels $c\ c$, which are attached to them by the arms $e\ e$. $f\ f$ are spur wheels working into the cogs $f'\ f'$ on the disks and similar cogs on the driving wheel $g$. $h\ h$ are guides for the spur wheels $f\ f$. $i\ i$ is a series of levers for connecting and disconnecting the spur wheels $f\ f$ with the driving wheel $g$ and the disks $d\ d'$. $j$ is a standard for holding the levers $i\ i$ in place when the machine is in operation. The full lines show the position of the levers $i\ i$, the guides $h\ h$, and the spur wheels $f\ f$, when at work; the dotted lines show their position, when not at work. $k$ is a lever for dumping; $l$ is an axis to which the box $b$ and the lever $k$ are permanently attached and on which the driving wheel $g$, the wheel $m$, and the disks $d\ d'$ revolve; $n$ is a pole for attaching a team and which may be shifted to such points on the frame $a\ a$ as may be required to equalize the draught.

is a brace to prevent racking the disks $d\ d'$ and the arms $e\ e$. The depth of

*Randall's Improvement in Excavators.* cutting and power required therefor may be regulated by raising the arms $e\,e$ in the slots, in which they are held in the disks $d\,d'$.

The shovels $c\,c$ revolve in a direction contrary to the motion of the wheels $g\,\&\,m$.

When loaded, the machine is thrown out of gear by lowering the levers $i\,i$; one set of the shovels $c\,c$ are removed, and the disks $d\,d'$ revolve so as to bring the place from which the shovels were removed under the axis $l$ and are held in this position by a catch on the frame $a\,a$, not shown in the drawing, while the load is being carried to the place of deposit.

The earth is discharged by moving the lever $k$, as indicated by the dotted line $p$, this turns the axis $l$ and inverts the box $b$. After returning to the place of loading, the box $b$ is turned upright by the lever $k$; the set of shovels, that were removed, are replaced; and the machine placed in gear by raising the levers $i\,i$.

I claim the cylinder form box $b$ and the revolving shovels $c\,c$ as combined, for the purpose specified.

WILLIAM RANDALL.

Witnesses:
    S. C. BARTER,
    A. S. PARTRIDGE.